UNITED STATES PATENT OFFICE.

UNITED STATES PATENT OFFICE.

HENRY SPENCER BLACKMORE, OF MOUNT VERNON, NEW YORK; ISABELLE BLACKMORE AND STEPHEN L. TINGLEY, ADMINISTRATORS OF SAID HENRY SPENCER BLACKMORE, DECEASED.

PIGMENT AND PAINT.

No Drawing. Application filed May 20, 1918. Serial No. 235,459.

*To all whom it may concern:*

Be it known that I, HENRY SPENCER BLACKMORE, a citizen of the United States, residing at Mount Vernon, in the county of Westchester and State of New York, have invented certain new and useful Improvements in Pigments and Paints, of which the following is a specification.

This invention relates to a pigment and paint thereof, and has for some of its objects the provision and production of a pigment or paint having a greater capacity, body, light resisting and covering or hiding power or character, and at the same time possessing great spreading power, less disintegrating or decomposing nature when exposed to ingredients of or associated with the atmosphere, more permanency or stability when exposed to light, less specific gravity, whereby the settling out from the paint vehicle is prevented, and which will be more readily miscible with oils or other vehicles than substances such as are commonly employed, and it comprises a compound or composition containing a metal combined with aluminium and oxygen, such as a metal aluminate, or more specifically zinc or magnesium aluminate, or its equivalent, associated or combined chemically or physically with a substance capable of altering or increasing the opacity of the aluminate, such as a water insoluble metal sulphide or sulphate, or more specifically zinc sulphide or barium sulphate, or its equivalent, or the composition of the aluminate and opacity altering or increasing ingredient, associated with a vehicle, such as an oil or drying oil, and more particularly of the linseed oil type, and in some cases with a diluent of drying nature, such as turpentine, to form a paint or similar commodity.

One of the difficulties experienced in the employment of the pigments in the prior art, in or as a paint associated with such vehicles as linseed oil or turpentine, is that the specific gravity of the compound or composition of the pigment is such that it soon separates or settles out from the vehicle in a mixed paint, which requires the re-mixing of the paint to obtain uniform consistency before it is used, or the re-mixing from time to time to prevent the settling in order to keep or maintain the paint in a utilizable condition; also that the paint is deficient in opacity, covering power, or body.

This is avoided in the present invention by the union, combination, or association of the metal of the pigment base with aluminium and oxygen in the form of an aluminate, such as zinc aluminate or magnesium aluminate, united or combined with an opacity altering or increasing substance, such as barium sulphate, or zinc sulphide, or both, which renders the compound or composition of light, flocculent character, rather than of dense, impervious nature, whereby its assimilation with and suspension in the paint vehicle employed is assured and maintained, and a great opaque character results, effecting a greater covering or hiding and spreading power.

As an example of a pigment or paint in accordance with the present invention and process whereby it may be made, we will take a compound or composition comprising zinc aluminate and barium sulphate. This compound or composition is preferably produced by exposing an aqueous solution of zinc sulphate to the action of barium aluminate in accordance with the following chemical formula or equation:

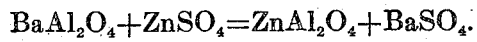

$$BaAl_2O_4 + ZnSO_4 = ZnAl_2O_4 + BaSO_4.$$

This compound or composition of zinc aluminate and barium sulphate, being formed simultaneously, is in such a close state of association that it appears to be in actual chemical combination or of physical-chemical character, resulting from its finely divided closely associated form or flocculent character.

This composition of metal aluminate with a light diffusive or opaque substance, such as barium sulphate, capable of altering or increasing the opacity of the metal aluminate when precipitated from aqueous solutions, is then thoroughly dried, heated and ground, whereby a light product of superior mixing quality with oils, and producing a paint which readily spreads, having an increased opaque body covering property of great light diffusive quality, especially when associated with such oils as linseed, tung and the like, or other oil or vehicle, or the same associated with a drier, such as turpentine, is obtained.

Instead of a pigment composed of zinc aluminate per se and an opacity altering or increasing substance, such as barium sulphate, the zinc aluminate may be associated with aluminium hydroxide, together with the opacity altering substance, such as barium sulphate, whereby the utility of the zinc aluminate may be enhanced and its spreading power and permanency increased.

Instead of employing barium sulphate as an opacity altering or increasing or light diffusive substance or ingredient, I can employ any other suitable ingredient having similar opacity altering or increasing properties, such as zinc sulphide, without departing from the spirit of the invention, or, the ingredients may be mixed or associated in any convenient or suitable manner, such as barium sulphate and zinc sulphide associated with an aluminate, such as zinc aluminate, and this compound or composition may be preferably produced in accordance with the following chemical formula or equation:

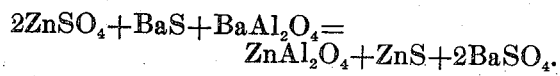

$$2ZnSO_4 + BaS + BaAl_2O_4 = ZnAl_2O_4 + ZnS + 2BaSO_4.$$

Instead of water insoluble zinc sulphide, zinc, aluminium, calcium, lead, or other metal fluoride may be employed, and while it is advisable to form all of the ingredients simultaneously, so that they may be thoroughly united or incorporated with each other, the ingredients may be formed and associated in any suitable or convenient manner, and thoroughly ground or incorporated to a loosely pulverized condition, it being advisable after the thorough association by precipitation or otherwise of the ingredients, to expose the same to the action of heat sufficient to enhance the opacity of the material and prevent permeation or striking in of oil in or through its body to a degree capable of effecting its opacity injuriously, and the whole after heating, finely comminuted and associated with a suitable vehicle, such as an oil, or an oil and a drier, as desired.

When the flocculent metal aluminate is heated with a metal sulphide, such as zinc sulphide, or fluoride, such as aluminium, zinc, calcium, lead, etc., the sulphide or fluoride appears to unite with the aluminate and render it largely unaffected as to the permeation of oil to a degree effecting the opacity of the composition.

Instead of zinc aluminate any other metal aluminate may be employed, such as magnesium aluminate, which magnesium aluminate, together with barium sulphate, may be produced in a manner identical with that for the production of zinc aluminate associated with barium sulphate, that is by exposing an aqueous solution of magnesium sulphate to the action of barium aluminate in accordance with the following chemical formula or equation:

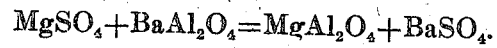

$$MgSO_4 + BaAl_2O_4 = MgAl_2O_4 + BaSO_4.$$

The composition of metal aluminate with an opacity altering or densifying substance, such as zinc aluminate and barium sulphate, may be associated with hydrate or hydroxide of metal or metals, or the equivalent thereof, like or unlike to the metal of the aluminate, or specifically zinc aluminate, aluminium hydroxide, and barium sulphate, or such compound or composition associated with a paint vehicle, such as a drying oil (linseed), or the same with a drier (turpentine), without departing from the spirit of the invention.

In manufacturing, shipping, or dispensing of mixed paints, in accordance with the present invention, the mineral constituents, such as zinc aluminate and barium sulphate, is of greater utility in that its lesser specific gravity than other pigments ordinarily employed maintains it in a mixed or suspended condition in the paint vehicle, thus avoiding the settling out of the pigment to a great extent, and yielding a more uniformly mixed paint and maintained as such, while the product is of superior light resistant character and is of greater opacity, covering, or body nature than a metal aluminate per se or the same associated with a metal hydroxide or hydrate, the whole yielding a paint when associated with the proper vehicle or the same and a drier, which is of greater utility, durability, spreading or hiding power and practical utility than pigments or paints of mixed character employed hitherto.

Any kind or character of metal aluminate may be employed in conjunction with the opacity altering or increasing or densifying substance, like barium sulphate or zinc sulphide, other than the normal aluminate, which aluminate may be of simple, compound, complex, or composite nature, and may be associated with like or unlike metal hydroxide in chemical combination or physical association.

It is obvious that the metal of the aluminate may exist at any valancy and the aluminate may comprise the normal, basic, acidic, or other variety, without departing from the spirit of the invention.

It should be noted that the pigment comprising zinc aluminate and barium sulphate or zinc sulphide, or both in accordance with the present invention, as ingredients of the paint, are of flocculent character and nature, and will readily take up and assimilate with oils or other vehicles without being permeated thereby to reduce the opacity of body density thereof with reference to light transmission to an injurious degree, and being preferably a semi-sintered precipitated product finely comminuted, it is of such pervious and flocculent nature that it remains suspended in and carried by the vehicle in a permanent manner as distinguished from other pigments.

It will be noted that the pigment, such as zinc aluminate and barium sulphate, or zinc sulphide, or both, may be modified by combination or association with a metal hydroxide or hydrate, such as aluminium hydroxide or hydrate, and a vehicle, such as an oil or a drying oil, may also be modified by combination or association with a drier, such as turpentine, whereby the utility of either or both of the pigment or vehicle may be augmented, the combined results rendered available and the general utility of the product enhanced, whereby functions are performed and results obtained, differing from those inherent in either of the members of the combination thereof independently or separately.

The substantially water insoluble sulphate or barium sulphate when employed, may be associated with suitable water insoluble sulphide, such as zinc sulphide or fluoride, so that when heated the aluminate is rendered more resistant to permeation of the material by the vehicle, and the rendering of the product translucent is thus avoided and prevented, and the utility of the aluminate as a pigment or paint augmented.

Another example of the process in accordance with the present invention, producing a product comprising a metal aluminate such as zinc aluminate or magnesium aluminate associated with a water-insoluble metal sulphide, such as zinc sulphide, and metal sulphate, such as barium sulphate may be referred to, which comprises making an aqueous solution of water soluble metal aluminate (sodium aluminate), sulphate (sodium sulphate), and sulphide (sodium sulphide), and making an aqueous solution of zinc chloride and barium chloride or of magnesium chloride, zinc chloride and barium chloride, and then mixing the solution of sodium aluminate, sulphate, and sulphide with either the solution of zinc chloride and barium chloride, or magnesium chloride, zinc chloride and barium chloride, whereby a precipitate results comprising zinc aluminate, zinc sulphide, and barium sulphate, as illustrated in the following chemical formula or equation marked (1), or magnesium aluminate, zinc sulphide and barium sulphate, as illustrated in the following chemical formula or equation marked (2), the precipitate in either case being separated, dried, heated, and suitably prepared for use as a paint:

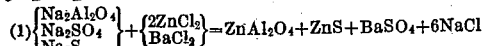

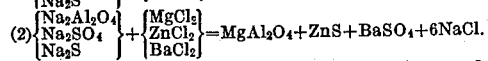

Having now described my invention what I claim is:

1. A new pigment, comprising a water insoluble metal aluminate blended with a water insoluble metal sulphate.

2. A new pigment, comprising a water insoluble metal aluminate blended with an alkali-earth metal sulphate.

3. A new pigment, comprising a water insoluble metal aluminate blended with barium sulphate.

4. A new pigment, comprising zinc aluminate blended with a water insoluble metal sulphate.

5. A new pigment, comprising zinc aluminate blended with an alkaline-earth metal sulphate.

6. A new pigment, comprising zinc aluminate blended with barium sulphate.

7. The process of making a paint pigment, which comprises performing a reaction between a metal sulphate and an aluminate of a metal the metal of which has a superior affinity for sulphuric acid and capable of forming a substantially water insoluble sulphate.

8. The process of making a paint pigment, which comprises performing a reaction between a water soluble metal aluminate and a water soluble metal sulphate, the product of which will comprise a water-insoluble aluminate mixed with a water-insoluble sulphate.

9. The process of making a paint pigment which comprises performing a reaction between barium aluminate and zinc sulphate, resulting in a product comprising zinc aluminate blended with barium sulphate.

10. The process of making a paint pigment which comprises exposing a metal aluminate and an opacity altering substance, to the action of heat sufficient to fix the material against light transmission, and rendering it translucent by paint vehicle absorption.

11. The process of making a paint pigment which comprises exposing a metal aluminate and an opacity increasing or densifying substance, to the action of heat sufficient to fix the material against light transmission and rendering it translucent by vehicle absorption.

In witness whereof, I affix my signature in the presence of two witnesses.

HENRY SPENCER BLACKMORE. [L. S.]

Witnesses:
F. L. WHITNER,
ERNEST H. BALL.